United States Patent
Schoettle et al.

(10) Patent No.: US 6,208,931 B1
(45) Date of Patent: Mar. 27, 2001

(54) POWER DISTRIBUTION SYSTEM IN A VEHICLE

(75) Inventors: Richard Schoettle, Muehlacker; Clemens Schmucker, Kornwestheim; Karl-Heinz Kaiser, Tamm, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,553

(22) PCT Filed: Sep. 30, 1998

(86) PCT No.: PCT/DE98/02890

§ 371 Date: Jun. 8, 1999

§ 102(e) Date: Jun. 8, 1999

(87) PCT Pub. No.: WO99/21261

PCT Pub. Date: Apr. 29, 1999

(30) Foreign Application Priority Data

Oct. 16, 1997 (DE) .............................. 197 45 849

(51) Int. Cl.[7] .............................. H02J 7/14; G06F 13/10
(52) U.S. Cl. .............................. 701/115; 322/7; 322/15; 322/23; 322/28; 290/40 C
(58) Field of Search .......................... 123/339.16, 339.17, 123/339.18; 290/40 A, 40 B, 40 C; 322/7, 8, 15, 22, 23, 24, 25, 27, 28; 701/102, 115

(56) References Cited

U.S. PATENT DOCUMENTS

| | | | |
|---|---|---|---|
| 4,402,288 | * | 9/1983 | Ohgami et al. ............... 290/40 C |
| 4,553,516 | * | 11/1985 | Hasegawa ...................... 290/40 C |
| 5,077,516 | * | 12/1991 | Meyer .................................. 322/7 |
| 5,200,900 | * | 4/1993 | Adrain et al. .................... 701/115 |
| 5,402,007 | * | 3/1995 | Center et al. .................. 290/40 B |
| 5,467,008 | * | 11/1995 | Uchinami ........................... 322/27 |
| 5,481,176 | * | 1/1996 | DeBiasi et al. ..................... 322/7 |
| 5,523,672 | * | 6/1996 | Schramm et al. ................. 322/25 |
| 5,670,845 | * | 9/1997 | Grant et al. ..................... 701/115 |

FOREIGN PATENT DOCUMENTS

601300 * 6/1994 (EP) .

* cited by examiner

Primary Examiner—Willis R. Wolfe
(74) Attorney, Agent, or Firm—Michael J. Striker

(57) ABSTRACT

The apparatus for energy distribution in a motor vehicle includes a vehicle electrical power supply system (11) with a generator (13) regulated by a voltage regulator (21), a battery (12) and consumers and a control arrangement (10) receiving required information from the power supply system for determining control parameters for engine or power supply system components. The control arrangement (10) includes the voltage regulator (21) and a supply system managing device (20). The supply system managing device (20) includes a device (24) for establishing an energy management strategy and a pre-control device (23) for generating a differential output for input to the device (24) according to an actual power and required power with respect to reference voltage. The pre-control device (23) and the device (24) for establishing an energy management strategy cooperate to determine a power supply set voltage (U_s) from the required information. The power supply set voltage (U_s) is compared with a measured actual voltage (U_ist) to produce a comparison results and the voltage regulator (21) regulates the generator according to the comparison result.

10 Claims, 4 Drawing Sheets

POWER DISTRIBUTION SYSTEM IN A VEHICLE

BACKGROUND OF THE INVENTION

1. Field of the Invention

The present invention relates to an apparatus for energy distribution in a motor vehicle having a vehicle electrical power supply system with a battery and a generator and, more particularly, to an apparatus for energy distribution in a motor vehicle having a vehicle electrical power supply system with a battery, a generator regulated by a voltage regulator and a number of consumers and a control arrangement to which required information is fed from t he vehicle electrical power supply system for determining control variables and regulating variables for corresponding components of the vehicle electrical power supply system and/or internal combustion engine. 2. Prior Art At present, supplying power to electric consumers in a motor vehicle increasingly presents a problem because the number and power consumption of the electric consumers in the vehicle are constantly increasing. At the same time, the available energy that is generated by means of a three-phase generator regulated by a voltage regulator cannot be increased to any desired extent because certain defaults or presets must be adhered to with respect to the size of the generator and its effects on the internal combustion engine driving it. In order to enable a reliable power supply of the electric consumers, various measures are currently implemented which either lead to an increase in output in the electrical energy delivered by the generator or which ensure that electric consumers which are not safety-related will be shut off at least temporarily in the event of critical energy supply so as to enable a reduction in the electric energy to be made available.

An energy supply system for the electric consumers in a motor vehicle in which it is suggested to switch electric consumers depending on the driving state is known from EP-0 601 300 B1. In the vehicle supply system described in this reference, the electric energy is generated in a conventional manner by a three-phase generator which is driven by the internal combustion engine. In order to save fuel, the internal combustion engine is turned off when the vehicle is stopped. Accordingly, no electric energy is generated by the generator during this time. On the other hand, in different driving states electrical energy which is used to charge the vehicle battery and to supply the electric consumers is generated in the customary manner. In order to achieve a reliable energy supply for operation-related electric consumers regardless of the driving state, a strategy for supplying electric consumers is pursued with the aid of a control device which communicates with various sensors and switches and which can influence electric actuators and display devices, wherein consumers are switched on and off automatically when the control device detects certain driving states. The hierarchy in which consumers are switched on and off is selected in such a way that unessential consumers are switched off first and consumers required for operation or related to safety are not switched off at all. In certain driving states, the electric energy is supplied by the vehicle battery or by an auxiliary battery which is uncoupled from the vehicle battery.

In the known energy supply in a vehicle supply system, the driving states are assumed to be given and not subject to influence and, in order to ensure adequate supply of energy to electric consumers, and it is stated only that groups of electric consumers are switched on or off corresponding to the detected driving state. However, influence is exerted on the internal combustion engine depending on the required electric output.

SUMMARY OF THE INVENTION

It is an object of the present invention to provide an improved apparatus for energy distribution to engine and power supply components, especially consumers, in a motor vehicle, which avoids or reduces the above-described disadvantages.

This object and others, which will be made more apparent hereinafter, are attained in an apparatus for energy distribution in a motor vehicle having a vehicle electrical power supply system with a generator regulated by a voltage regulator, a battery and a number of consumers and a control arrangement to which required information is fed from the vehicle electrical power supply system for determining control variables and regulating variables for corresponding components of the vehicle electrical power supply system and/or internal combustion engine.

According to the invention the control arrangement includes the voltage regulator and a vehicle power supply system managing means. The vehicle power supply system managing means includes means for establishing an energy management strategy and pre-control means, which cooperate to determine at least one set value of the power supply set voltage from the required information with the help of a predetermined energy distribution strategy. The at least one set value of the power supply set voltage is compared with a measured voltage to produce a comparison result and the voltage regulator regulates the generator according to the comparison result. The voltage regulator and the pre-control means are formed as separate units.

In contrast to the prior art, a further improvement in the supplying of electrical energy is achieved by the apparatus according to the invention for energy distribution in a motor vehicle. At the same time, it is ensured that the battery charge level remains within a desired range. Further, an improved interaction between the generator, battery, vehicle drive or drivetrain and electric consumers is achieved. Voltage fluctuations in the electric power supply are advantageously reduced, so that it is possible to achieve a voltage tolerance range which meets the requirements of especially sensitive consumers, for example, control devices, in particular. Further, the reliability of the electric vehicle supply system is advantageously increased and the design criteria for the generator and battery are simplified in an advantageous manner.

These advantages are achieved in that an apparatus for energy distribution in the motor vehicle operates in such a way that the internal combustion engine driving the generator as well as the electric consumers of the vehicle supply system are taken into account in the distribution strategy. For this purpose, the information supplied by the vehicle supply system and internal combustion engine is processed in a control arrangement for determining control variables and/ or regulating variables and these quantities are supplied to the appropriate components in the vehicle supply system or internal combustion engine. The energy distribution is then carried out by the control arrangement according to predeterminable requirements, taking into account the condition that the actual voltage of the vehicle supply system lies within predeterminable limits.

The required information is advantageously obtained via suitable sensors or state detectors and is supplied to the control arrangement. This control arrangement acts, by way of determined control signals, on different components of the vehicle supply system or on the internal combustion engine itself. A differential output corresponding to the difference between the required output with respect to reference voltage and the realized output is determined in an advantageous manner. An actual voltage of the vehicle supply system can be determined from this differential output. The vehicle supply system manager changes the required output and/or the realized output in such a way that the resulting actual voltage of the vehicle supply system remains within the tolerance range.

In a particularly advantageous manner, the control arrangement which carries out the energy distribution is arranged as a vehicle supply system manager, wherein the energy management structure comprises a voltage regulator, pre-control and management strategy. The interaction of the generator, battery, drivetrain and electric consumers can be predetermined by this energy management structure, wherein special requirements can be taken into account for this purpose. By means of the pre-control, it is possible to keep the vehicle supply system voltage within a narrow tolerance margin because the actual voltage given by the previously calculated differential output can be influenced by steps implemented by the vehicle supply system manager (so that it remains within the tolerance margin). Deviations from the reference voltage are advantageously compensated by the voltage regulator.

Through the selection of a suitable management strategy, an ideal combination of energy generation, energy distribution and energy consumption is given for the respective state of the vehicle, internal combustion engine and vehicle supply system. In particular, when the battery charge state is low, the speed of the internal combustion engine can be increased; the generator can also be changed to an overexcited operation and/or electric consumer outputs can be reduced or electric consumers which are not absolutely necessary can be entirely shut off when a deficit of power is detected.

By changing the vehicle supply system parameters, the drivetrain can be relieved in case full power is needed during acceleration of the vehicle. In this case, the generator torque loading the engine can be reduced by switching off higher consumers or by completely or partially uncoupling the generator. As long as the internal combustion engine is operated in a state below full power, the loading generator torque can be increased, wherein the additional load must be compensated through regulation of the internal combustion engine.

Since the vehicle supply system manager allocates all relevant consumer powers, it also influences the switch-on and switch-off behavior of these consumers; this also applies to duration with respect to time. The switch-on and switch-off behavior and the close coupling with the engine control, for example, a torque requirement before switching on an additional electric load, advantageously makes it possible to dispense with the load-response function which is conventionally used to some extent at the present time, wherein load-response function signifies a delayed increase in generator current after high loads are switched on. Worst-case requirements on the generator, commonly used at the present time, can be reduced because the charge state can be maintained to the necessary degree, when required, through steps such as reduction in consumer power or increased speed and generator overexcitation.

The control arrangement and vehicle supply system manager can be constructed as an independent control device which cooperates with the control device of the internal combustion engine as well as with the control part of the voltage regulator, wherein corresponding connections and interfaces must exist. However, the vehicle supply system manager can also be a component part of the vehicle control device or can be integrated in an intelligent voltage regulator, wherein the connection between the internal combustion engine control device and the voltage regulator must be constructed in a suitable manner. The vehicle control device can also take over all of the functions of the vehicle supply system manager.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

TABLE 1

Figure 1:
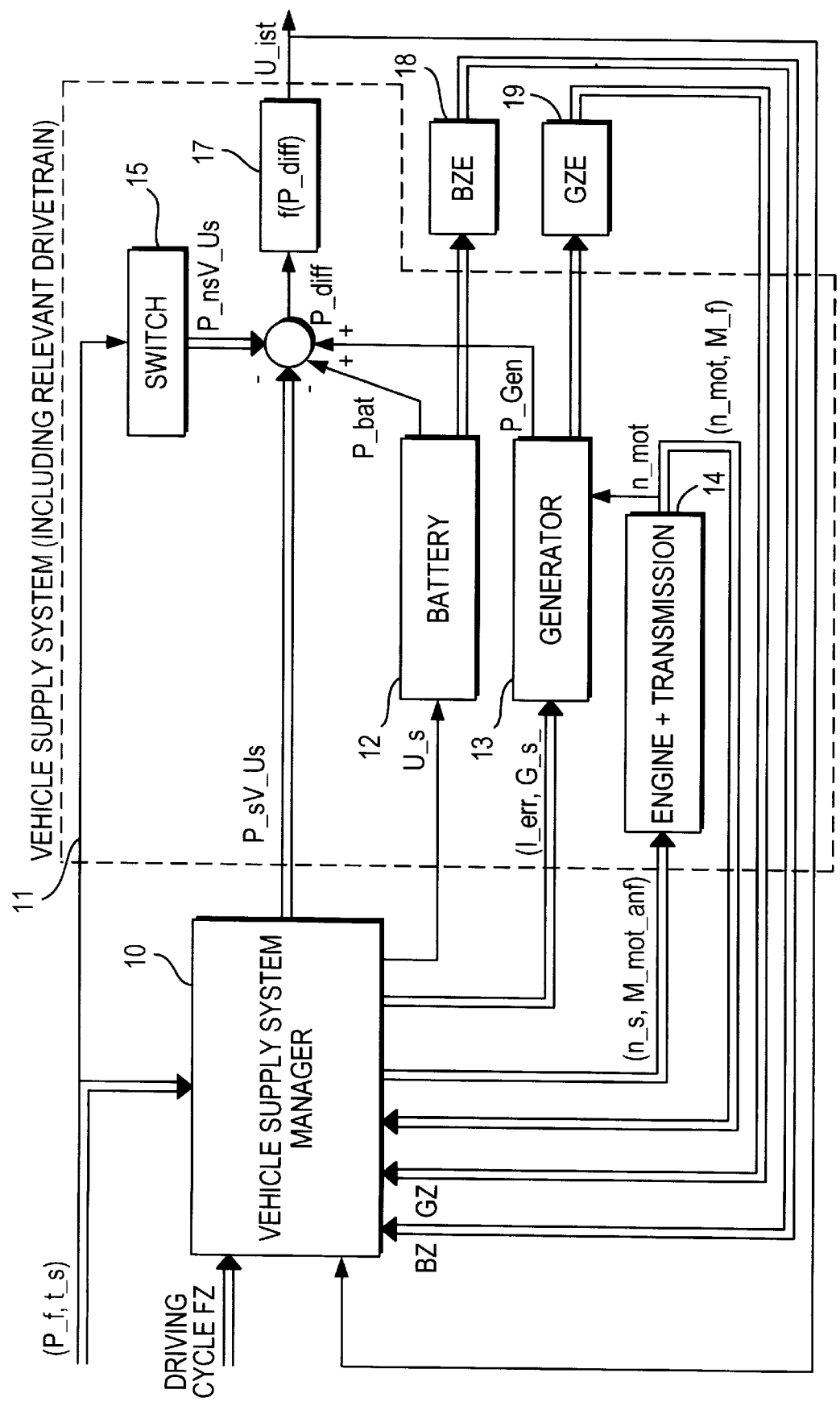
FIG. 1 is a block diagram of an apparatus according to the invention for energy distribution in a motor vehicle having a vehicle electrical power supply system and a control arrangement for managing distribution of electrical power to components of the vehicle supply system and the internal combustion engine.
Figure 2:
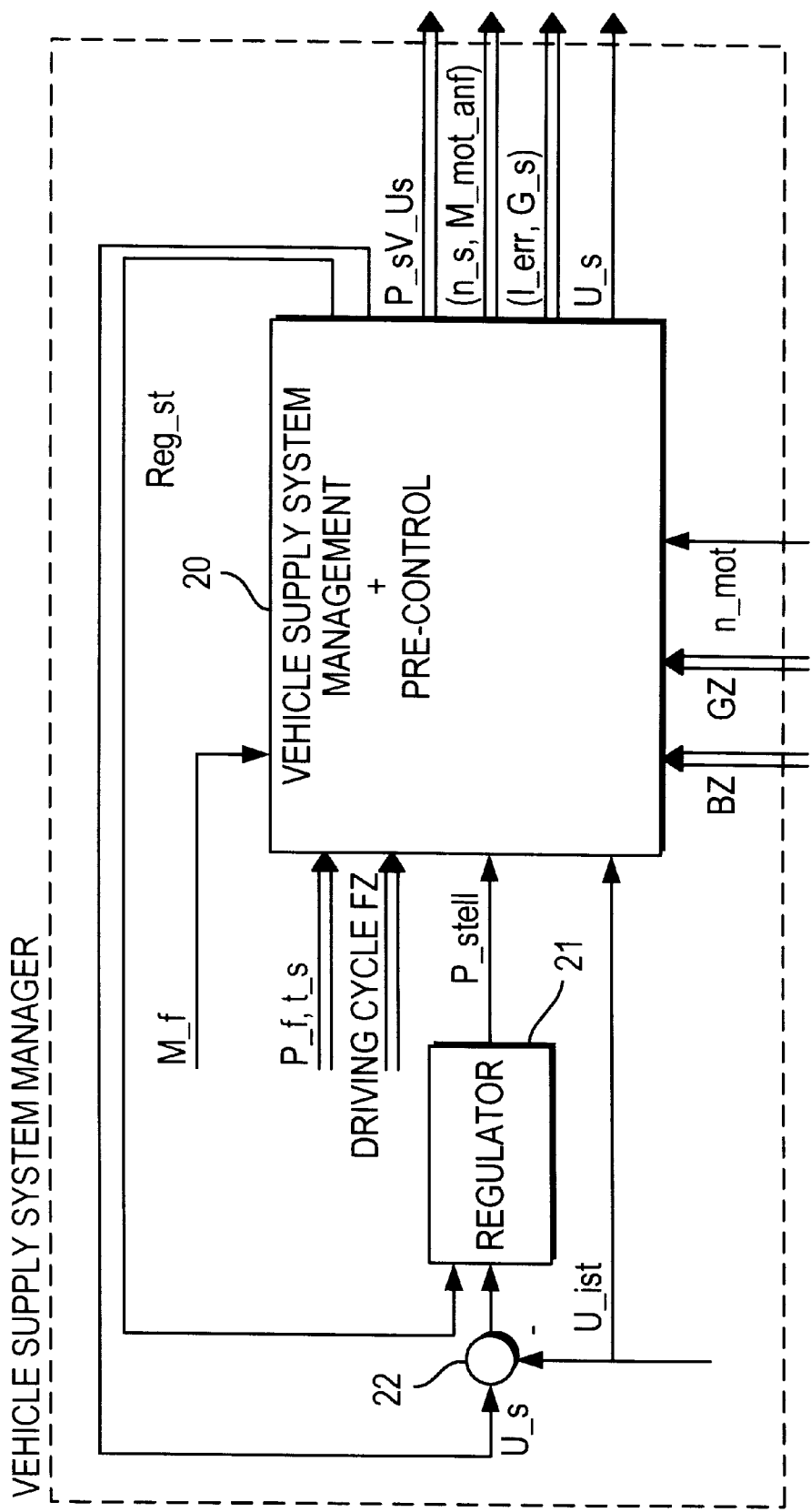
FIG. 2 is a block diagram of the vehicle power supply system manager.
Figure 3:
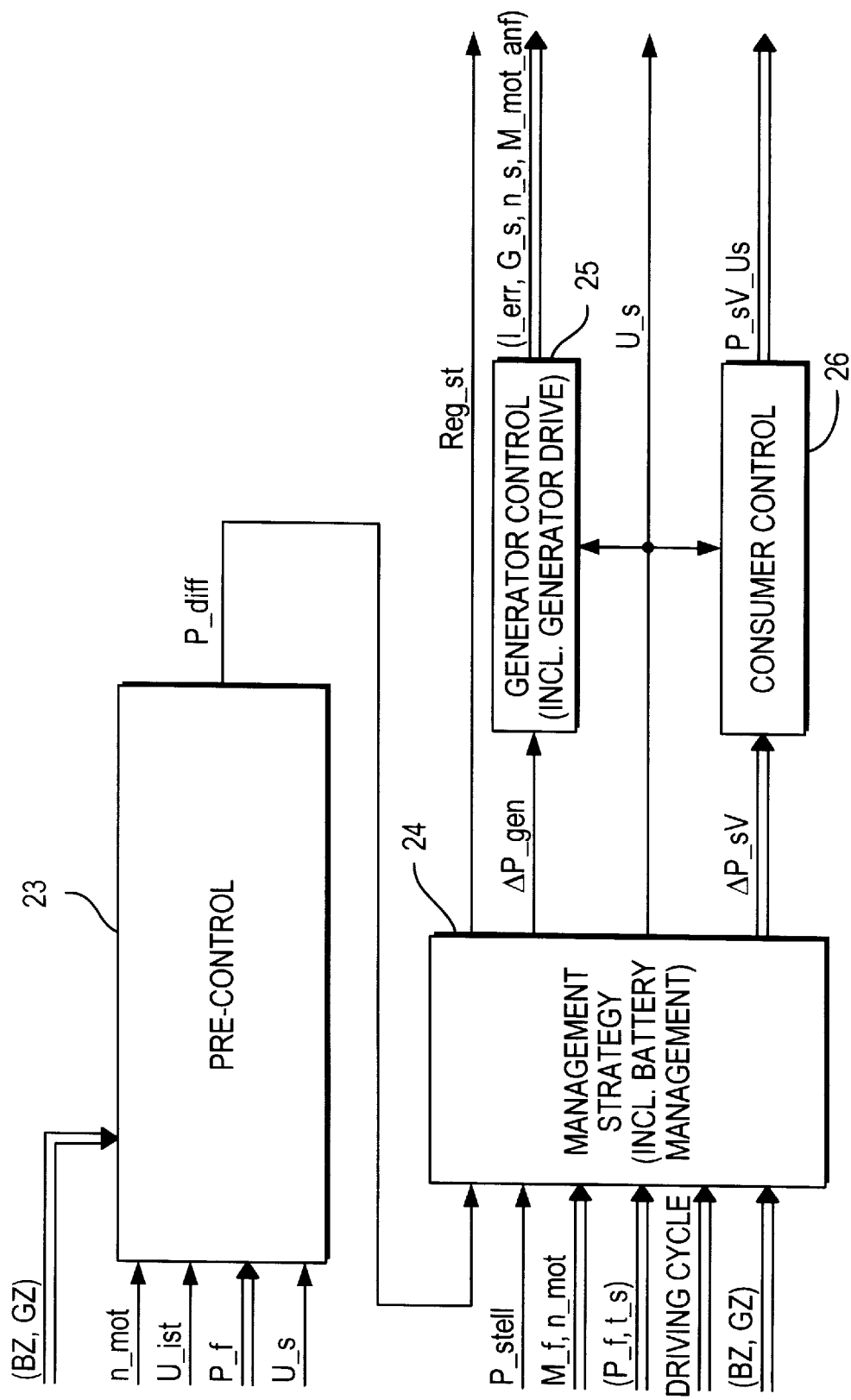
FIG. 3 is a block diagram of the control arrangement according to the invention including the energy management strategy means and pre-control means.

Definition of abbreviations used in FIGS. 1 to 3

| | |
|---|---|
| BN | vehicle supply system |
| BZ | battery state |
| BZE | battery state detection (calculation or measurement) |
| AP_gen | change in output to be realized by the generator |
| AP_sV | change in output to be realized by consumer management |
| FZ | information about future driving cycle |
| G_s | parameter vector for generator control, e.g., control of pulse inverter |
| GZ | generator state |
| GZE | generator state detection (calculation or measurement) |
| I_err | exciter current |
| M_f | torque requirement of drivetrain on vehicle supply system |
| M_mot_anf | torque requirement of vehicle supply system on drivetrain |
| n_mot | speed of internal combustion engine |
| n_s | speed demand of vehicle supply system on drivetrain with the aim of changing the generator speed, i.e., change in generator transmission ratio is also possible. |
| P_Bat | battery output |
| P_diff | differential output = demanded output in relation to reference voltage – realized output |
| P_f | power requirement |
| P_Gen | electric generator output |
| P_nsV_Us | power of non-controllable consumers in relation to reference voltage – realizable output |
| P_stell | regulator output value (actuating variable), power indication |
| P_sV_Us | allocated power of controllable consumers in relation to reference voltage |
| Reg_s | parameters for regulator control, e.g., for stopping the integrator |
| t_s | allowed switching time (time in which the demanded output must be realized) |
| U_ist | actual voltage of vehicle supply system |
| U_s | reference voltage of vehicle supply system |

TABLE 1-continued

Figure 4:
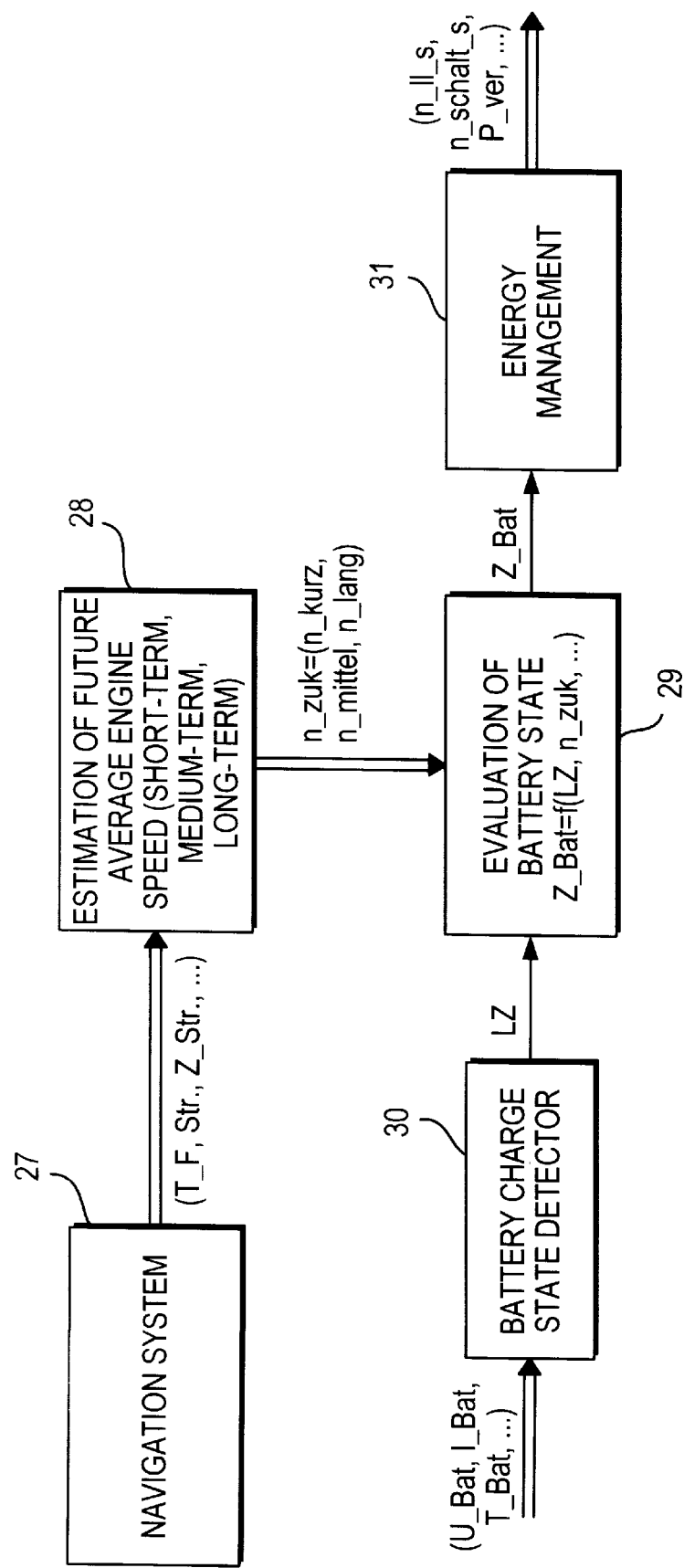
FIG. 4 is a block diagram of part of another embodiment for managing distribution of electrical power including a navigation system.

For FIG. 4:

| | |
|---|---|
| U_Bat | battery voltage |
| I_Bat | battery current |
| T_Bat | battery temperature |
| T_F | driving period |
| Str | type of road (highway, rural road, city) |
| Z_Str | state of road (traffic volume, . . . ) |
| Z_Bat | battery state (very critical, critical, satisfactory, good) = BZ |
| LZ | battery charge state |
| N_11:S | idling reference speed |
| n_schalt_s | switching thresholds of transmission control |
| P_ver | available consumer power |
| n_zuk | vector of future average available speed with components n_kurz: short-term speed availability |
| n_mittel | medium-term available speed |
| n_lang | long-term available speed |

FIG. 1 shows the energy management structure making possible the energy distribution between the vehicle supply system and the internal combustion engine or motor. The control arrangement 10, also referred to as vehicle supply system manager, is responsible for the energy distribution. This control arrangement is essentially a microprocessor with a central processor unit, not shown, and storage means and input/output means by which the signals can be supplied and emitted. The control arrangement 10 determines from the information that is supplied, for example, by suitable sensors or state detection devices and the like, the control signals which can be supplied to the individual components. Reference is had to Table 1 with regard to the abbreviations.

The coupling of the vehicle supply system manager formed by the control arrangement 10 to the vehicle supply system and the relevant drivetrain is represented in FIG. 1 as a block diagram. With respect to the vehicle supply system 11, including the drivetrain relevant to the vehicle supply system, FIG. 1 shows the battery 12, the generator 13, the unit comprising engine and transmission 14, a switch group 15, a summation point 16 and a block 17 in which a function of the differential output to be defined hereinafter is formed. In addition to the vehicle supply system 11, a battery state detector 18 and generator state detector 19 are also shown. The blocks are interconnected by arrows showing the input or output of quantities which are defined more fully in Table 1. The direction of the arrows determines the signal direction.

The following signals and information are fed to the control arrangement 10 and vehicle supply system manager: The demanded power P_f, the permissible switching time t_s, meaning the time in which the required output must be realized; information about the driving cycle, the engine speed M_f, the torque requirement of the drivetrain on the vehicle supply system M_f, information about the generator state GZ which is obtained by means of the generator state detector shown in block 19. Further, information about the battery state obtained in the battery state detector 18 is supplied to the vehicle supply system manager and, finally, the vehicle supply system actual voltage U_ist required for regulation of the generator voltage is also supplied. The optimum energy distribution is calculated and the control signals required for this are formed based on the quantities indicated above as well as on further information, if required, and/or based on data or characteristic fields stored in the storages of the control arrangement 10. These control signals are sent by the control arrangement 10, that is, by the vehicle supply system manager. In particular, these control signals are: a vehicle supply system reference voltage U_s which is supplied to the battery 12, an exciter current I_err which can be predetermined, and a parameter vector for generator control, for example, for controlling the pulse inverter of the rectifier bridge G_s belonging to the generator and supplied to the generator 13. A speed request addressed to the drivetrain by the vehicle supply system is sent to the engine and transmission 14 with the aim of changing the generator speed, if necessary also by influencing the generator transmission ratio n_s; further, a torque requirement M_mot_anf addressed to the drivetrain by the vehicle supply system is sent to the engine and transmission 14. The allotted power of the controllable consumers with reference to the reference voltage P_sV_Us is supplied to the summation point 16. The differential output P_diff, which is the demanded power with respect to the reference voltage minus the realizable output, is formed by the allotted power and other outputs which can be supplied.

In order to determine the theoretical differential output in the vehicle supply system manager, the vehicle supply system is simulated by way of a model. This procedure is described with reference to the real vehicle supply system (FIG. 1). The actually supplied generator output P_Gen, the output P_Bat actually delivered by the battery, the demanded power of the controllable consumers at reference voltage P_sV_Us and the demanded power of the non-controllable consumers at reference voltage P_nsV_Us are supplied to the summation point 16. There is always an power equilibrium in the vehicle supply system, that is, generated power is equal to consumed power. The generated power as well as the consumed power depend on the actual voltage. When the delivered power differs from the demanded power at reference voltage, the actual voltage of the vehicle supply system is adjusted in such a way that the consumer power at actual voltage is equal to the generated power. This is shown by the function in block 17. This voltage change is calculated beforehand in the vehicle supply system manager before changes are made to the vehicle supply system state, for example, before consumers are switched. If the prior calculation shows that the actual value of the vehicle supply system lies outside of the tolerance range after the changes have been realized in the vehicle supply system, the vehicle supply system manager takes steps to prevent this.

Another arrow shown between the engine and transmission 14 and the generator 13 symbolizes that the motor speed or internal combustion engine speed n_mot is essential for the operation of the generator 13. As is known, the generator 13 is driven by the engine 14, possibly via a transmission. The achievable generator speed is accordingly correlated with the engine speed, possibly taking into account a transmission, if present. The dependency of the generator speed on the engine speed can be influenced by influencing the transmission.

The energy management according to the invention is realized by means of the vehicle supply system manager contained in the control arrangement 10 based on the quantities and relationships indicated in FIG. 1. The vehicle supply system manager operates the generator 13, the battery 12, the drivetrain, in particular the motor and transmission 14, and the consumers of the vehicle which are not shown in more detail in FIG. 1, so that, on the average, a balanced charge state is ensured in the vehicle supply system and the voltage position is maintained within a specified range or margin.

The vehicle supply system manager decides about a suitable strategy for the generation and distribution of power based on the battery state, the generator state, the drivetrain state, the vehicle supply system voltage, or battery voltage, and the required electrical power. In so doing, controllable electric consumers are distinguished from non-controllable electric consumers, wherein the latter constitute an electric load which cannot be influenced. These consumers are those which may not be switched off under any circumstances because they are absolutely necessary for the proper functioning of the overall arrangement.

The vehicle supply system manager allocates the available electric power to the controllable electric consumers. This allocation includes switch-on behavior and switch-off behavior as well as the times for switching on and switching off. Further, the vehicle supply system manager also gives the relevant quantities for the generator control. For example, the exciter current which is supplied to the exciter winding of the generator is adjusted by the vehicle supply system manager, wherein the prevailing conditions are taken into account. The vehicle supply system manager calculates an optimum vehicle supply system reference voltage and compares it with the actual voltage and, by way of suitable connections, can influence parameters which determine the generator speed.

FIG. 2 shows the essential parts of the vehicle supply system manager in more detail. The control arrangement is designated as vehicle supply system management plus pre-control. The following input quantities are supplied to the vehicle supply system management plus pre-control: the torque requirement of the drivetrain and vehicle supply system M_f, the power requirement P_f, the allowed switching time t_s, that is, the time in which the required power must be realized, information about the future driving cycle, FZ, an actuating variable supplied by the regulator 21 which, as regulator output quantity P_stell, contains an output statement. Further, the vehicle supply system actual voltage U_ist, information about the battery state BZ, the generator state GZ, and the speed of the internal combustion engine n_mot is also supplied.

Proceeding from the quantities mentioned above as well as additional quantities, if required, the vehicle supply system management plus pre-control determines the control quantities required for energy management and energy distribution and sends them to the appropriate components of the vehicle supply system and the motor itself via connections.

The output quantities sent by the vehicle supply system management plus pre-control are: the allotted power of the controllable consumers with respect to reference voltage P_sV_Us, the speed requested of the drivetrain by the vehicle supply system with the aim of changing the generator speed, possibly also by changing the generator transmission ratio n_s, torque requirement of the vehicle supply system drivetrain M_mot_anf, exciter current I_err, parameter vector for generator control, for example, for controlling the pulse inverter G_s, vehicle supply system reference voltage U_s. Further, the output quantity comprising the parameters Reg_s for regulator control, for example, for halting the integrator integrated in the regulator, is sent to the regulator 21. The vehicle supply system reference voltage U_s is fed to a summation point 22 communicating with the input of the regulator 21 and is superposed therein with the vehicle supply system actual voltage U_ist for forming a voltage-dependent input quantity for the regulator 21.

The determination of the output quantities of the vehicle supply system manager is explained with reference to the relationships shown in FIG. 3. In the block diagram according to FIG. 3, a first block 23 designates the pre-control, to which is supplied information respecting the battery state and generator state. Further, the engine speed n_mot, the vehicle supply system actual voltage U_ist, the power requirement P_f and the vehicle supply system reference voltage U_s are supplied to the pre-control 23. These quantities are measured or determined by means of suitable detection means. They are used for the pre-control 23 to form the differential output P_diff which corresponds to the difference between the required power with respect to reference voltage and the realized power.

The differential output determined in the pre-control is supplied to block 24, the management strategy, including a battery management as first input quantity. Additional input quantities of block 24 of the management strategy are: the output quantity of the regulator (block 21) P_stell, the torque demand made by the drivetrain on the vehicle supply system M_f, the engine speed n_mot, the power requirement P_f, the allowed switching time t_s, that is the time in which the required power P_f must be realized. Further, information about the future driving cycle FZ as well as information regarding the battery state and generator state is supplied to block 24 of the management strategy.

Depending on the supplied information and on the differential output determined in the pre-control 23, control signals for the voltage regulator Reg_s are supplied to the management strategy in block 24. These signals represent parameters for regulator control, for example, for stopping the integrator integrated in the voltage regulator.

The change in output to be realized by the generator ΔP_gen is supplied as additional output quantities of the management strategy 24 to block 25 which represents the generator control, including the generator drive. Essential quantities for the generator are determined in this block 25. For example, these quantities are the exciter current I_err, a parameter vector for the generator control G_s which is used, for example, for controlling the pulse inverter of the generator. Further, the speed request is sent to the drivetrain by the vehicle supply system n_s with the aim of changing the generator speed, wherein a change in the generator transmission ratio can also be contained in this signal. Finally, the torque requirement is sent to the drivetrain by the vehicle supply system M_mot_anf. In another block 26, the consumer control is carried out. For this purpose, the change in output ΔP_sV which is to be realized by way of the consumer management is reported in block 26 by the management strategy 24. The vehicle supply system reference voltage U_s is supplied by the management strategy 24 to the generator control 25 on the one hand and to the consumer control 26 on the other hand and is available for further evaluation devices as an individual signal.

Depending on the vehicle supply system reference voltage U_s and the change in output ΔP_sV which is to be realized by way of the consumer management, the consumer control determines the allotted power of the controllable consumers with respect to the reference voltage P_sV_Us. Depending on this allotted power, the controllable consumers are switched on or off by the vehicle supply system management.

As is shown in FIGS. 2 and 3, the vehicle supply system manager is formed of two main blocks, the regulator 21 and the vehicle supply system management and pre-control block 20. The pre-control calculates the output difference to be adjusted from the realized electric output and required future output. Accordingly, the following calculation is carried out: P_diff=P_gef−P_real. The occurring difference must be compensated through steps undertaken by the vehicle supply system manager until the required power is allocated so as to prevent or minimize a voltage dip in the vehicle supply system It must be ensured that the specified voltage tolerance margin is not departed from. Possible steps for adapting output include, for example, manipulation of the generator excitation or changing the power allocation for determined consumers. These steps must be introduced in case the vehicle supply system manager determines that the desired energy distribution poses problems.

Deviations from the reference voltage due to an inexact estimation of the output to be realized in the future are compensated by the voltage regulator. Its actuating variable, the change in output, is an input quantity of the management strategy which decides how the change in output is to be realized.

Within the framework of the management strategy, the vehicle supply system reference voltage which is essentially determined by the desired battery voltage is determined in addition. Due to the interaction of the energy management structure comprising the regulator and the pre-control and management strategy, the interaction of the generator, battery, drivetrain and electric consumers can be adapted to predeterminable desired processes. By means of the pre-control to which the actual voltage is also always supplied, it is possible to keep the vehicle supply system voltage within a narrow tolerance margin. Deviations from the reference voltage are compensated by the regulator 21.

As a result of a suitable management strategy, the ideal combination of energy generation, energy distribution and energy consumption is given. Suitable steps are, for example, an increase in the engine speed, especially the idling speed in the event of a low battery charge or over-excitation of the generator under conditions which do not lead to heavy loads, for example, thermal loading. It is also possible to switch off uncritical consumers in the event of deterioration of the battery charge state. Similarly, the generator torque loading the engine during acceleration of the vehicle can be reduced by uncoupling the generator or by switching off consumers. The strategy carried out for energy distribution can be predetermined and is taken into account by the vehicle supply system manager.

A possibility for expanding the previously described energy management should be described in the following with reference to FIG. 4. In FIG. 4, an embodiment form is shown in which a navigation system which is already available in many vehicles in any case is taken into account in determining the anticipated driving cycle FZ. This navigation system supplies a large amount of information which can be taken into account in estimating the anticipated future engine speed.

The navigation system is designated by 27 in FIG. 4. It delivers information about the driving duration T_F, the type of road Str (highway, country road, city) to be expected in the near future, and information about the state of the road Z_Str taking into account the expected traffic volume. The information available to the navigation system is used in block 28 to estimate future average engine speed. The speeds expected over the short term, medium term and long term can be determined. In block 28, a vector n_zuk is formed for estimating the future average engine speed which serves as a vector of the future average available speed and has components n_kurz. These components have to do with the available speed anticipated over the short term. The same kind of vector can be formed for the medium-term available speed n_mittel and the long-term available speed n_lang.

The vectors formed in this way are taken into account in block 29 in the evaluation of the battery state. For optimum evaluation of the battery charge state, information about the battery charge state LZ is supplied in block 29 and is determined in the battery charge state detector 30. The battery charge state detector 30 evaluates, for example, the battery voltage U_Bat, battery current I_Bat, battery temperature T_Bat and, if necessary, additional quantities.

In the evaluation of the battery state in block 29, a battery state Z_Bat is determined as a function of the battery charge state, anticipated speed and possibly additional anticipated quantities. The battery state Z_Bat is supplied to the energy management 31. The battery state Z_Bat can be defined, for example, by four states (very critical, critical, satisfactory, good). Depending on these states, the energy management 31 regulates the entire energy distribution of the vehicle and vehicle supply system. For this purpose, the energy management 31 gives control signals to corresponding components, for example, an idling reference speed n_11_s, switching thresholds of the transmission control n_schalt_s, available consumer power P_ver, etc.

By taking into account information obtained from data of the navigation system with respect to estimating future average engine speed, it is possible to take into account the expected speed in the energy management. Accordingly, it is possible initially to dispense with an increase in the engine speed in the event of a low charge in case the estimation of the future engine speed indicates that an increased speed demand is expected, for example, as a result of highway driving. Unnecessary increases in speed can be avoided with a procedure of this kind and accordingly unnecessary fuel consumption can be reduced. In estimating the battery state, the current charge state can always be evaluated in connection with the future available speed and appropriate steps can be instituted. A low charge state when traffic jams are expected is evaluated as more critical than the same charge state in connection with highway driving with high available speed. If no information is known about the future driving cycle, the worst case must be assumed and steps must be initiated for improving the battery charge state when falling below an established charge state threshold. The above-mentioned steps, including switching off electric consumers, increasing the idling speed, manipulating the transmission control to speed level, etc. must be taken. These steps lead to a higher fuel requirement or to a loss of functionality. They can be avoided by evaluating the information supplied by the navigation system.

What is claimed is:

1. An apparatus for energy distribution in a motor vehicle having an internal combustion engine (14), said apparatus comprising a vehicle electrical power supply system (11) including a generator (13) regulated by a voltage regulator (21), at least one battery (12) and a plurality of consumers, said generator (13) being driven by said internal combustion engine (14), and a control arrangement (10) to which required information is fed from the vehicle electrical power supply system for determining control variables and regulating variables for corresponding components of at least one of the vehicle electrical power supply system and the internal combustion engine (14);

wherein said control arrangement (10) comprises means for energy distribution management between the electrical power supply system and the internal combustion engine according to predetermined requirements so that a power supply set voltage (U_s) is kept within predetermined limits; and wherein said control arrangement (10) comprises said voltage regulator (21) and a vehicle power supply system managing means (20), said vehicle power supply system managing means (20) including means (24) for establishing an energy management strategy and pre-control means (23) for generating a differential output (P_diff) from at least a part of said required information, said differential output being input into said means (24) for establishing an energy management strategy and corresponding to a difference between actual power and required power with respect to a reference voltage, so that said means (24) for establishing an energy management strategy and said pre-control means cooperate with each other to determine at least one set value of the power supply set voltage (U_s) from said required information with the help of a predetermined energy distribution strategy, as well as means (22) for comparing said at least one set value of the power supply set voltage (U_s) with a measured voltage (U_ist) to provide a comparison result; and wherein the voltage regulator (21) includes means for generating a power adjusting parameter (P_stell) according to said comparison result and means for regulating said generator (13) according to said power adjusting parameter; and said voltage regulator and said pre-control means are formed as separate units.

2. The apparatus as defined in claim 1, wherein said control arrangement (10) is a microprocessor independent and separate from said voltage regulator (21) or a control device of the internal combustion engine.

3. The apparatus as defined in claim 1, wherein said control arrangement (10) is a microprocessor integrated in said voltage regulator (21) or a control device of the internal combustion engine.

4. The apparatus as defined in claim 1, further comprising a battery state detector (18) and a generator state detector communicating with the vehicle power supply system managing means (20).

5. The apparatus as defined in claim 1, wherein said voltage regulator (21), said means (24) for establishing an energy management strategy and said pre-control means (23) are separate and independent devices.

6. The apparatus as defined in claim 1, wherein said vehicle power supply system managing means (20) includes a generator controller (25) and a consumer controller (26) and said means (24) for establishing an energy management strategy (24) generates control signals for said generator controller (25) for controlling said generator (13) and other control signals to said consumer controller (26) for generating consumer controlling signals.

7. The apparatus as defined in claim 1, wherein said vehicle power supply system managing means (20) includes means for optimizing electrical energy distribution from said required information, said required information including a power requirement (P_f), an allowed switching time (t_s) in which a required power level must be reached, a battery state (BZ), a generator state (GZ), a measured voltage (U_ist) of the vehicle power supply system, a torque requirement (M_f) of a drive train on the vehicle power supply system, a driving cycle (FZ), an engine speed (n_mot) and said power adjusting parameter (P_stell).

8. The apparatus as defined in claim 7, wherein said vehicle power supply system managing means (20) includes means for generating at least one output signal for a variable selected from the group consisting of said power supply set voltage (U_s), a parameter vector (G_s) for generator control, a parameter vector of a pulse inverter of a rectifier bridge for said generator, a torque requirement on a drive train (M_mot_anf) of the motor vehicle and a speed requirement on said drive train for changing generator speed, taking into account a generator transmission ratio (n_s) and power requirements of non-controllable consumers in relation to another reference voltage (P_nsv_Us).

9. The apparatus as defined in claim 1, wherein said vehicle power supply system managing means (20) includes a navigation system (27) with means for outputting data regarding driving duration and state and type of a road traveled by said motor vehicle as well as an expected driving cycle and said control arrangement (10) includes means (28) for estimating a future average engine speed based on said data from said navigation system (27).

10. The apparatus as defined in claim 9, further comprising means for evaluating battery charge state according to said future average engine speed.

* * * * *